United States Patent Office 3,471,858
Patented Oct. 7, 1969

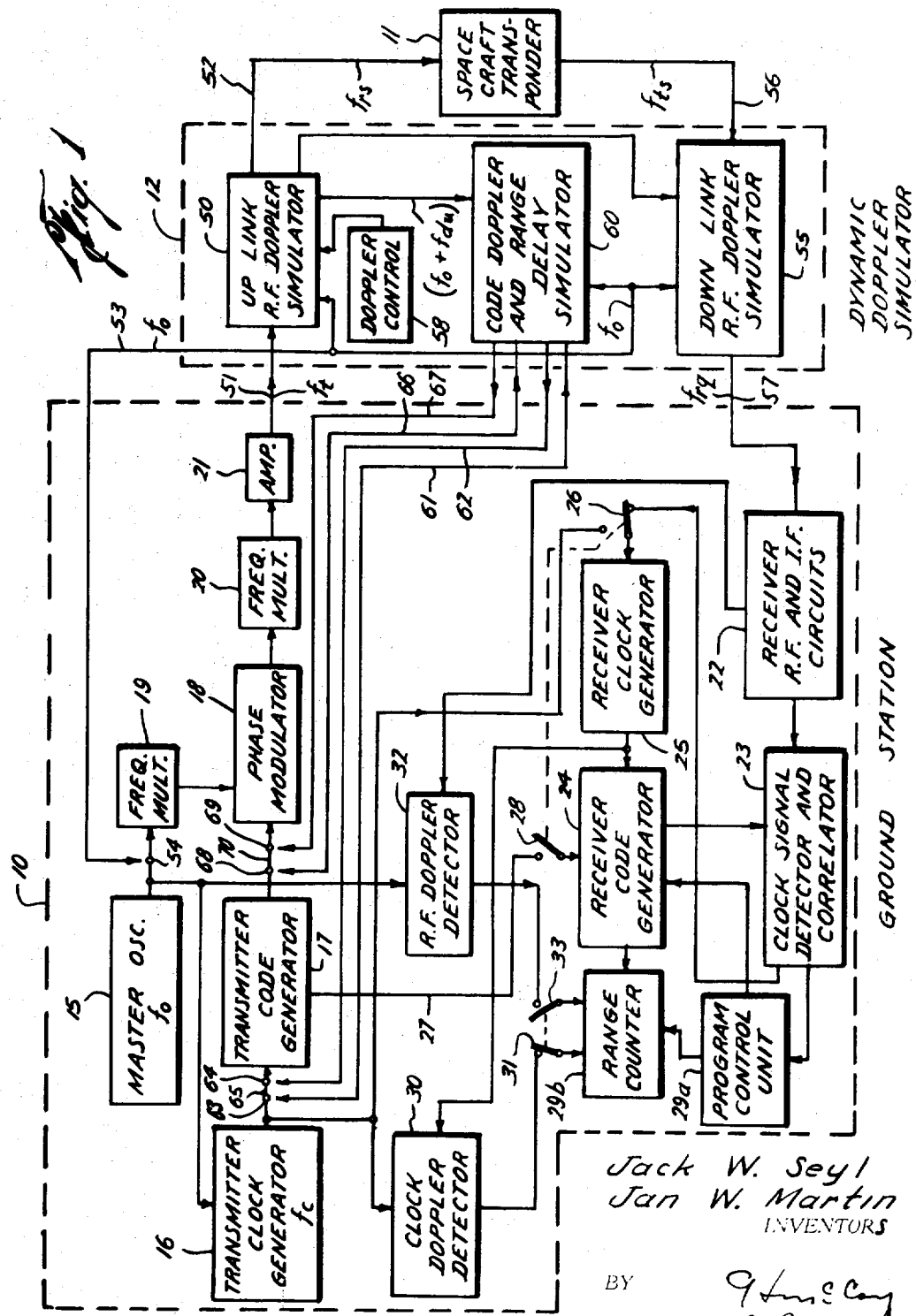

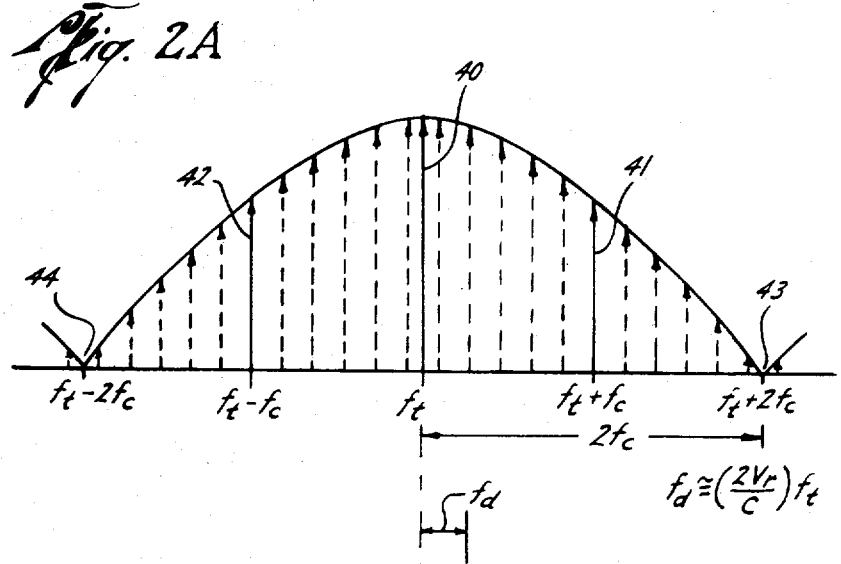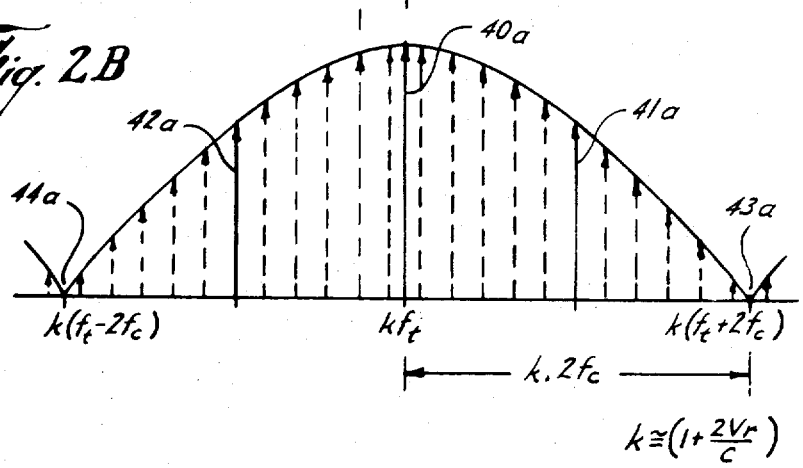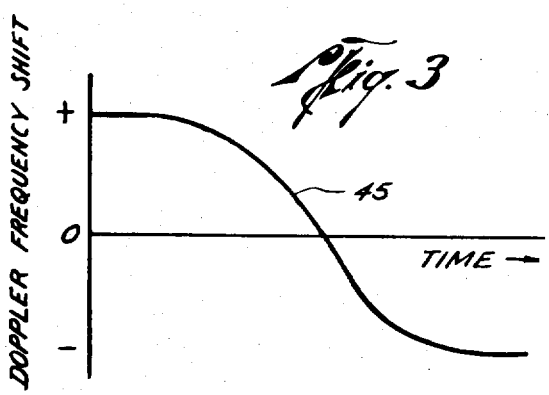

3,471,858
DYNAMIC DOPPLER SIMULATOR
Jack W. Seyl, Houston, Tex., and Jan W. Martin, Burlington, Mass., assignors to the United States of America as represented by the Administrator of the National Aeronautics and Space Administration
Filed Oct. 30, 1968, Ser. No. 771,803
Int. Cl. G01s 7/40
U.S. Cl. 343—17.7  10 Claims

ABSTRACT OF THE DISCLOSURE

Apparatus for testing ground station ranging equipment and cooperating spacecraft transponder equipment, both of which are ground based and stationary during the testing process. The testing apparatus includes a first frequency translator for transferring a code-modulated radio-frequency ranging signal from the ground station transmitter to the receiver portion of the spacecraft transponder, such first frequency translator operating to shift the frequency of the radio-frequency carrier to simulate an up-link Doppler effect which might be encountered in actual space flight. The testing apparatus also includes circuit means which are coupled to the modulation signal generating portion of the ground station transmitter for shifting the frequency of the modulation signal components by an amount representing the corresponding Doppler effect on the radio-frequency carrier sidebands produced by such modulation components. The testing apparatus further includes time delay means coupled to the modulation signal generating portion of the ground station transmitter for time delaying the code modulation signals before they are supplied to the radio-frequency modulator portion of such transmitter. The testing apparatus additionally includes a second frequency translator for transferring the reply signal from the spacecraft transponder transmitter to the ground station receiver, such second frequency translator operating to shift the frequency of the returning radio-frequency carrier signal to simulate the corresponding down-link Doppler effect.

BACKGROUND OF THE INVENTION

The invention described herein was made by employees of the United States Government and may be manufactured and used by or for the Government for governmental purposes without the payment of any royalties thereon or therefor.

This invention relates to apparatus for testing spacecraft radio-frequency ranging and communications equipment in a manner which simulates actual space flight conditions.

When transmitting radio signals between a ground station and a moving spacecraft or between two spacecraft moving at different velocities relative to one another, the frequency of the received signal differs from the frequency of the transmitted signal because of the Doppler effect. The received signal may be either higher or lower in frequency than the transmitted signal, depending on whether the transmitter and receiver are approaching or are receding from one another. The magnitude of the frequency change depends on the velocity of the transmitter relative to the receiver or vice versa. The greater the relative velocity, the greater the frequency change.

If the radio signal is modualted, then it includes not only the carrier frequency but also a series of sideband frequencies which are produced by the various frequency components of the modulation signal. The Doppler effect also operates on these sidebands, but the amount of the frequency shift is different than that of the carrier frequency and it is different for each of the different sidebands. In other words, the magnitude of the Doppler effect is frequency dependent as well as velocity dependent. The higher the transmitted frequency, the greater the Doppler shift for a given velocity. As a result, not only is the transmitted frequency spectrum shifted as a whole, but also the width of the spectrum is changed. The spectrum width is expanded if the transmitter and receiver are approaching one another and contracted if the transmitter and receiver are receding from one another.

In general, the relative velocity between a transmitter and a receiver which are located on two different moving bodies is not likely to be constant at least not for very long. For example, for the case of a ground-based transmitter and a spacecraft receiver, it is the radial component of velocity that determines the magnitude of the Doppler shift. By radial component is meant the vector component of the spacecraft velocity which is directed in a straight line manner at the ground station transmitter. As the spacecraft moves from horizon to horizon over a ground station, this radial component of velocity is constantly changing. Thus the Doppler effect on a radio signal being transmitted between the ground station and the spacecraft is constantly changing. The individual frequency components are being continually shifted and the spectrum bandwidth is being continually changed.

Needless to say, it is desirable to ground test the various ground station-to-spacecraft and spacecraft-to-spacecraft communications systems and ranging (distance measuring) systems before such systems are put into actual use. The degree of confidence which is provided by such ground testing is largely dependent upon the degree of realism which can be accomplished in simulating actual space flight conditions. This, of course, includes the simulation of the Doppler effect.

Unfortunately, it is not easy to realistically simulate a continually varying Doppler effect for the case of a modulated radio-frequency carrier signal, particularly where the modulation involves any degree of complexity or is itself changing with time. The various frequency components are continually shifting by different amounts and the overall bandwidth is continually changing. Prior to the present invention, it is not known that anyone has ever proposed a practical system for the precise simulation of Doppler effects in such a situation.

SUMMARY OF THE INVENTION

It is an object of the invention, therefore, to provide new and improved apparatus for testing spacecraft radio-frequency ranging and communications equipment in a manner which simulates the Doppler effect on the radio-frequency signals under actual space flight conditions.

It is another object of the invention to provide new and improved apparatus for simulating space flight Doppler effects on a radio-frequency signal having relatively complex signal modulation.

It is a further object of the invention to provide new and improved apparatus for simulating space flight Doppler effects on a radio-frequency signal wherein the simulation program can be readily changed to simulate a wide variety of flight patterns and orbital patterns.

It is an additional object of the invention to provide new and improved apparatus for testing spacecraft ranging equipment and which is capable of simulating lunar distance type radio wave propagation time factors as well as space flight Doppler effects.

In accordance with the invention, there is provided apparatus for testing spacecraft radio-frequency ranging and communications equipment in a manner which simulates actual space flight conditions. Such apparatus comprises frequency translation means for transferring a modulated radio-frequency carrier signal from transmitting equipment to separate receiving equipment, both of which are stationary relative to one another during the testing process. Such frequency translation means includes means for shifting the frequency of the radio-frequency carrier by an amount representing a Doppler effect which might be encountered when at least one of these equipments is moving at a spacecraft velocity relative to the other. The testing apparatus further includes signal-modifying circuit means coupled to the modulation signal generating portion of the transmitting equipment for causing a modified modulation signal to be supplied to the carrier modulator portion of such equipment. Each frequency component of such modified modulation signal has a frequency shift representing the corresponding Doppler effect on the radio-frequency carrier sidebands for such frequency component.

For a better understanding of the present invention, together with other and further objects and features thereof, reference is made to the following description taken in connection with the accompanying drawings, the scope of the invention being pointed out in the appended claims.

BRIEF DESCRIPTION OF THE DRAWINGS

Referring to the drawings:

FIG. 1 is a block type schematic diagram of a spacecraft ranging system and testing apparatus constructed in accordance with the present invention for testing such system;

FIGS. 2A and 2B are graphs representing the frequency spectrum of a modulated radio-frequency carrier signal before and after the occurrence of Doppler effect;

FIG. 3 is a graph of Doppler frequency shift versus time for a representative spacecraft orbital flight pattern.

DESCRIPTION OF THE PREFERRED EMBODIMENT

Figure 4:
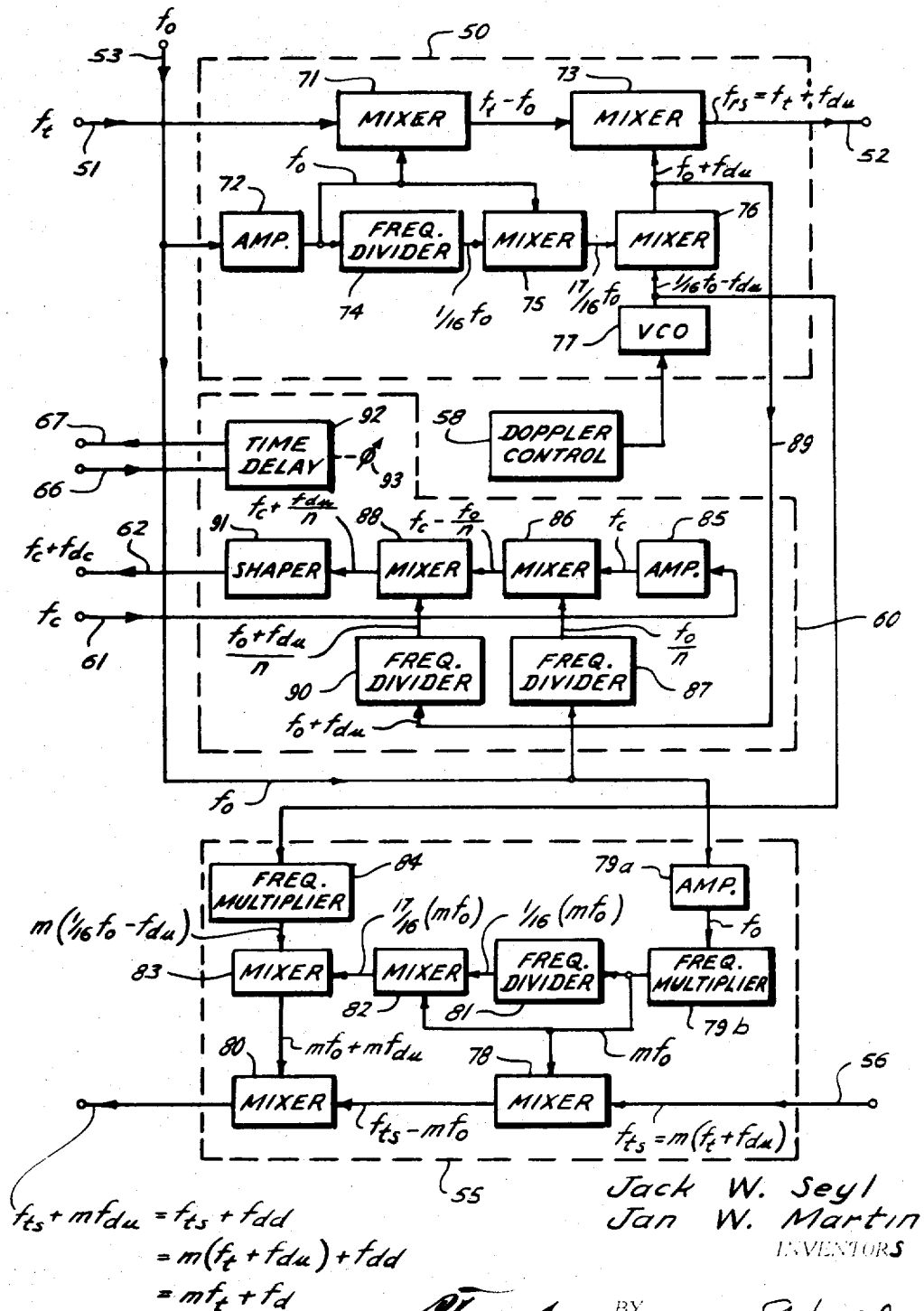
FIG. 4 is a more detailed block diagram of the testing apparatus of FIG. 1.

Referring to FIG. 1 of the drawings, there are shown the principal elements of a code type spacecraft ranging system, together with a representative embodiment of a testing apparatus constructed in accordance with the present invention for testing such ranging system. The ranging system includes ground station equipment 10 and a space flight transponder 11. In use, the transponder 11 would be mounted on board a spacecraft which is moving through space. During the testing process, the transponder 11 is located on the ground at the same place as the ground station equipment 10. The testing apparatus is comprised of a dynamic Doppler simulator unit 12 which is connected between the ground station equipment 10 and the spacecraft transponder 11 during the testing process.

DESCRIPTION OF SPACECRAFT RANGING SYSTEM

The spacecraft ranging system shown in FIG. 1 is typical of the types of ranging and communications systems in connection with which the present invention is useful. Such ranging system is a so-called pseudo-random ranging system and will be used by the National Aeronautics and Space Administration (NASA) in connection with their Apollo "man on the moon" program. The system will provide a continuous running indication of the instantaneous distance of the spacecraft from the ground station, even at distances well in excess of the distance between the earth and the moon. The ranging system is capable of measuring the distance to the spacecraft to within ±15 meters, even at the nominal lunar distance of 215,000 nautical miles.

The ground station equipment 10 generates a group of pseudo-random binary pulse sequences to form a range code signal. The range code signal is then phase modulated onto a radio-frequency carrier signal which is transmitted to the spacecraft. The transponder 11 in the spacecraft receives the radio-frequency signal, demodulates the code signal and then remodulates the code signal onto a new radio-frequency carrier signal which is transmitted back to the ground station equipment 10. The ground station equipment 10 then demodulates the received signal and performs a correlation operation on the demodulated code signal sequences. This correlation operation provides a measurement of the round-trip propagation time of the radio waves from the ground station to the spacecraft and then back again. Such propagation time is, of course, proportional to the separation distance between the ground station and the spacecraft.

The ground station equipment 10 includes a master oscillator 15 oscillating at a frequency $f_0$ of, for example, 20 megahertz. The signal from oscillator 15 is supplied to a modulation signal generating portion of the equipment, which portion is comprised of a transmitter clock signal generator 16 and a transmitter code signal generator 17. The clock signal generator 16 is synchronized by the signals from the oscillator 15 and produces an output square-wave signal having a frequency $f_c$ of, for example, 500 kilohertz. Such clock signal drives the code generator 17 which, in turn, generates the psuedo-random binary pulse sequences. These code pulse sequences are generated by shift registers located in the generator 17, the vertical transitions in the clock signal supplied by the generator 16 controlling the shifting action. The range code signals generated by generator 17 are supplied to the carrier modulator portion of the ground station transmitting equipment. Such portion includes a phase modulator 18 which is receiving an intermediate-frequency carrier signal having a frequency which is a multiple of the master oscillator frequency $f_0$. Such intermediate-frequency carrier is provided by a frequency multiplier circuit 19. The range code signals from generator 17 serve to phase modulate the carrier signal supplied by multiplier 19. The resulting modulated carrier signal is multiplied in frequency by a frequency multiplier circuit 20 and amplified by a power amplifier circuit 21. The carrier frequency $f_t$ appearing at the output of amplifier 21 is, for example, 2000 megahertz. In actual spaceflight use, such modulated radio-frequency carrier signal appearing at the output of amplifier 21 would be supplied to the ground station transmitting antenna and transmitted to the distant spacecraft.

When the transmitted signal is received by the spacecraft transponder, such transponder demodulates or detects the range code modulation signal. Such detected signal is then used by the transponder to modulate a coherent down-link radio-frequency carrier signal generated in the transmitting portion of the transponder. The frequency of the down-link carrier signal is slightly different from the frequency of the up-link carrier signal transmitted by the ground station. The down-link carrier frequency may be, for example, 240/221 times the frequency of the up-link carrier signal. The modulated down-link carrier signal is transmitted by the transponder transmitter back to the ground station receiving antenna.

The receiver portion of the ground station equipment 10 includes receiver R.F. and I.F. circuits 22 which, in spaceflight use, are connected to the receiving antenna. Such circuits 22 serve to demodulate the received radio-frequency (R.F.) signal and to supply the detected range code signals to a clock signal detector and correlator 23. Also supplied to the clock signal detector and correlator 23 are locally-generated range code signals which are generated by a receiver code generator 24. The binary coding of these local code signals are identical to that of the originally-transmitted code signals. Clock signal detector and correlator 23 operates to mix the locally-generated signals with the incoming received signals to detect or recover the clock signal component of the incoming received signals. This recovered clock signal is used to drive a receiver clock generator 25 by way of a switch 26. The output of the receiver clock generator 25 is a square-wave signal having a frequency which is the same as the frequency of the recovered clock signal. This clock signal generated by generator 25 is supplied to the receiver code generator 24 for driving the shift registers therein which are producing the locally-generated code signals. Since such clock signal was derived from the incoming signal, this establishes phase or bit timing synchronism between the incoming and locally-generated code signals.

Initially, the receiver code generator 24 is running in step with the transmitter code generator 17 such that the binary sequences generated by the two generators are identical in time with one another. This synchronism is provided by supplying synchronizing signals from the transmitter code generator 17 to the receiver code generator 24 by way of circuit connection 27 and switch 28. In order to determine the round-trip propagation time for the incoming code, switch 28 is opened and the locally-generated code sequence is time shifted in a step by step manner until it is in agreement with the incoming code sequence. Such agreement causes the correlator 23 to produce a maximum correlation signal. This produces a control signal which is supplied by the correlator 23 to a program control unit 29a. Unit 29a thereupon supplies to the receiver code generator 24 a signal which causes the receiver code generator 24 to supply to a range counter 29b a digital signal representing the number of bit shifts required of the locally-generated code sequence in order to produce the maximum correlation signal. This digital signal represents the distance or range of the spacecraft at the beginning of the correlation process.

Since as much as some 60 seconds may be required to complete the correlation process, the initial range measurement will be slightly out of date at the time it is supplied to the range counter 29b if the spacecraft has undergone any net movement toward or away from the ground station during such 60 second time interval. This is taken into account and the range counter reading is continuously up-dated by means of a clock Doppler detector 30. The clock Doppler detector 30 compares the output of the receiver clock generator 25 (which is of the same frequency as the incoming clock component) with the output of the transmitter clock generator 16 (which is of the same frequency as the transmitted clock component) and determines the rate of change of range of the spacecraft or, in other words, the velocity of the spacecraft. This is determined from the difference in frequency or Doppler shift of the received clock component relative to the transmitted clock component. Such Doppler shift is proportional to the spacecraft velocity.

This velocity measurement is continuously integrated by a suitable integrator circuit in the detector 30 and the integrated signal is used to trigger a pulse generator in the detector 30 each time it reaches a value representing a selected distance increment. The pulse generator pulses are supplied to the range counter 29b to provide a measure of the distance traveled by the spacecraft during the time required for the code acquisition or correlation process. These Doppler detector pulses are supplied to the range counter 29b by way of a switch 31, which at this time is in its closed position. Since the spacecraft range may decrease as well as increase, detector 30 and counter 29b are constructed to provide for bi-directional operation of counter 29b.

After the acquisition or correlation process has been completed, the range counter 29b is switched from the clock Doppler detector 30 to a radio-frequency (R.F.) Doppler detector 32. The R.F. Doppler detector 32 compares an intermediate-frequency value of the incoming R.F. carrier, as obtained from the circuit 22, with the signal generated by master oscillator 15. In the absense of any Doppler shift, this intermediate-frequency carrier value would be the same as the frequency of the signal from master oscillator 15. As for the clock Doppler, the R.F. Doppler shift is also proportional to the spacecraft velocity. This R.F. Doppler shift is detected by the detector 32, integrated and used to trigger a pulse generator (these latter circuits also being included in the detector 32) in a similar manner as for the clock Doppler detector 30. The resulting pulses are supplied by way of a switch 33 to the range counter 29b. Because of the higher frequency of the R.F. carrier, the measurements provided by the R.F. Doppler detector 32 are of a much finer resolution. For example, the R.F. Doppler detector 32 may be constructed to produce an output pulse for each one-meter change in spacecraft range, while the clock Doppler detector 30 may be constructed to provide an output pulse for each 75-meter change in spacecraft range.

During an actual spaceflight, the ranging system of FIG. 1 is operated in the following general manner. The equipment is turned on and the transmitter portion is allowed to transmit range code signals to the spacecraft. Switch 26 is initially set to its upper position (opposite of that shown in drawing), switch 28 is initially closed, switch 31 is initially closed and switch 33 is initially open. This condition is allowed to continue for a short interval of time to allow the receiver clock generator 25 to fall into synchronism with the transmitter clock generator 16 and to allow the receiver code generator 24 to fall into synchronism with the transmitter code generator 17.

Following this initial setup procedure, the range counter 29b is reset to zero. At that same instant, the switch 26 is placed in its lower position (position shown in the drawing) and switch 28 is opened. This starts the acquisition or correlation process. At the same time, the range counter 29b commences to count the pulses from clock Doppler detecter 30. A short time thereafter, the receiver code generator 24 establishes maximum correlation with the incoming code signal being received back from the spacecraft. At this time, the digital signal representing the initial range measurement is transferred to the range counter 29b. As soon as that is done, switch 31 is opened and switch 33 is closed to enable the range counter 29b to commence the counting of the finer resolution distance pulses from the R.F. Doppler detector 32. The resetting of the counter 29b to zero and the opening and closing or switching of the various switches is controlled by the program control unit 29a.

After the correlation process has been completed and the ground station equipment 10 switched over to R.F. Doppler operation, the transmitter code generator 17 can, if desired, be turned off because only the R.F. carrier itself is being used during this phase of the operation. Such R.F. carrier Doppler detection will provide continuous real-time up-dating of the range counter 29b until such time as it may again become desirable to repeat the code correlation process.

DISCUSSION OF DOPPLER EFFECT

Where relative movement is occurring between a radio transmitter and a radio receiver, the frequency of the signal received at the receiver differs from the frequency of the transmitted signal because of the so-called Doppler effect. The frequency of the signal received at the receiver is described by the following mathematical relationship:

$$f_2 \cong f_1 \left(1 + \frac{V_r}{c}\right) \quad (1)$$

where:

$f_1$ = transmitted frequency
$f_2$ = received frequency
$c$ = velocity of light
$V_r$ = relative velocity between transmitter and receiver The velocity factor $V_r$ is taken as positive if the transmitter and receiver are approaching one another and negative if the transmitter and receiver are receding from one another. The relative velocity is the velocity component directed in a radial or straight line direction from one to the other of the two objects.

As an example of a typical application of the present invention, the Doppler effect on the spacecraft ranging system of FIG. 1 will now be considered. The following analysis will consider in detail only the carrier component of the modulated radio-frequency signal. It will then be explained how the analysis can be extended to the other frequency components of the transmitted radio-frequency signal.

Assuming that the ground station transmitter transmits a radio-frequency carrier component of frequency $f_t$, the frequency of the carrier component received at the spacecraft is described by the following expression:

$$f_{rs} = f_t + f_{du} \quad (2)$$

where:

$f_{rs}$ = carrier frequency received at spacecraft
$f_t$ = carrier frequency transmitted by ground station
$f_{du}$ = up-link Doppler shift $$\left(f_{du} = f_t \cdot \frac{V_r}{c}\right)$$

As previously indicated, the spacecraft transponder unit 11 operates to demodulate the received signal and to remodulate the detected modulation signal onto a new radio-frequency carrier signal. Thus, the R.F. carrier component transmitted by the spacecraft transponder is described by the following expression:

$$f_{ts} = m(f_t + f_{du}) \quad (3)$$

where:

$f_{ts}$ = carrier frequency transmitted by spacecraft
$m$ = transponder ratio ($m = f_{ts}/f_{rs}$).

In a typical case, the factor "$m$" is equal to 1.086. Thus, the transmitted carrier component is just slightly higher in frequency than was the received carrier component. The reason for the frequency shift in the transponder is that the FIG. 1 system is a continuous wave (C.W.) type of system. Thus, it is necessary that the down-link frequency be slightly different in order to operate both transmitter and receiver continuously.

The down-link carrier component as received at the ground station is described by the following expression:

$$f_{rg} = m(f_t + f_{du}) + f_{dd} \quad (4)$$

where:

$f_{rg}$ = carrier frequency received at ground station
$f_{dd}$ = down-link Doppler shift ($f_{dd} = mf_{du}$).

Equation 4 shows the various factors which enter into the overall process and cause the ground station received frequency to differ from the original ground station transmitted frequency.

The ground station received frequency of the carrier component can also be expressed by the following relationship:

$$f_{rg} \cong mf_t\left(1 + \frac{2V_r}{c}\right) \quad (5)$$

This shows in a direct manner the effect of the spacecraft velocity on the received frequency.

The round-trip Doppler frequency shift of the carrier component is described by the following expression:

$$f_d = mf_{du} + f_{dd} \quad (6)$$

where $f_d$ = round trip Doppler shift.

This is the Doppler change or shift in frequency experienced in going from ground station to spacecraft and then back to the ground station again. This round-trip change can also be described in terms of the spacecraft velocity by the expression:

$$f_d \cong mf_t\left(\frac{2V_r}{c}\right) \quad (7)$$

The foregoing analysis only applies to the carrier component of the modulated radio-frequency signal. To obtain the overall picture, the same type of analysis must be separately applied to each of the individual sideband frequency components of the transmitted signal. The reason for this can be seen from Equations 5 and 7. As there seen, both the final frequency (Equation 5) and the change in frequency (Equation 7) are dependent on the value of the frequency originally transmitted. In other words, since the frequencies of the different sideband components are different, the Doppler effect on such components is different.

Referring to FIG. 2A, there is shown a typical frequency spectrum for a ranging system of the type shown in FIG. 1. The horizontal axis is scaled in terms of frequency units and the vertical axis is scaled in terms of power units. FIG. 2A shows the spectrum of the signal as it is transmitted from the ground station. The carrier component is indicated at 40. The upper and lower sideband components produced by the clock frequency component of the modulation signal are indicated at 41 and 42, respectively. The remainder of the sideband components depicted in FIG. 2A are produced by one of the range code components of the modulation signal. This is a periodic range code component having a repetition frequency of, for example, $\frac{1}{11}$ of the clock signal frequency. It produces spectral components at $\frac{1}{11}$, $\frac{3}{11}$, $\frac{5}{11}$, et cetera, of the clock frequency. The actual Apollo ranging system will use four different range code components or sub-codes, but for sake of simplicity only one of these will be considered herein. The null points indicated at 43 and 44 are determined by the range code bit width which, in the present example, is equal to one-half the clock period. Thus, the frequency span from the carrier component indicated at 40 to the first upper null point 43 is equal to $2f_c$. Since the frequency spectrum is symmetrical, this will be used as a measure of the width of the spectrum.

FIG. 2B shows the corresponding frequency spectrum of the modulated radio-frequency signal received back at the ground station after transmission to and from the spacecraft. One simplifying assumption was made in constructing FIG. 2B. It was assumed that the transponder ratio "$m$" was equal to unity. The spectrum of FIG. 2B is approximately the same as that of FIG. 2A except that the entire spectrum has been shifted upwardly in frequency by an amount "$f_d$" because of the Doppler effect. (The upward shift assumes a "closing" velocity, that is, that the spacecraft is approaching the ground station.) A typical maximum value for the round-trip Doppler shift "$f_d$" at earth escape velocity is about 200 kilohertz.

In addition to the overall shifting of the spectrum, the width of the spectrum of FIG. 2B is changed. This is indicated by the fact that the frequency span between the carrier component indicated at 40a and the first upper null indicated at 43a is now $k(2f_c)$. This "$k$" factor is a Doppler effect factor which is dependent on the spacecraft velocity. Its magnitude is indicated by the bracketed portion of Equation 5.

If account is to be taken of the fact that the transponder ratio "$m$" is not quite equal to unity, then the mathematics becomes a bit more complicated. The overall general effect, however, remains the same. The spectrum is shifted in frequency and the width of the spectrum is changed by the Doppler effect. (FIG. 2B can be made to include the transponder ratio by substituting the quantity "$mf_t$" for the quantity "$f_t$.")

FIG. 3 is a graph showing an example of the way in which the Doppler frequency shift might vary with time for the case of a moving spacecraft. Curve 45 of FIG. 3 represents the Doppler shift variation for the case of a spacecraft in orbit around the earth. It is assumed that the spacecraft is passing from one horizon to the other and during such journey passes over the ground station. When the spacecraft first appears on the horizon, its radial component of velocity relative to the ground station is relatively large. Since this is a closing velocity, a relatively large positive Doppler shift is produced, as represented by the left-hand portion of curve 45. As the spacecraft approaches the ground station the magnitude of the shift decreases. It becomes zero at that instant when the spacecraft is directly overhead. As the spacecraft recedes from the ground station toward the opposite horizon, the magnitude of the Doppler shift begins to increase again, this time in a negative direction (denoting a decrease in frequency) because the velocity is an opening velocity.

The effect on the spectrum of FIG. 2B of a time variation in the Doppler effect of the type depicted in FIG. 3 is that the spectrum will initially have a maximum upward shift and will subsequently shift to the left until the spectrum reaches the limit on the low frequency side of the original transmitted carrier frequency $f_t$. At the same time, the width of the frequency spectrum will be changing from a maximum expanded value when the spacecraft first appears on the horizon, to its original transmitted value when the spacecraft is directly overhead and finally to its maximum contracted value (minimum width) when the spacecraft reaches the opposite horizon.

DESCRIPTION OF DOPPLER SIMULATOR TESTING APPARATUS

Returning now to FIG. 1, there is shown dynamic Doppler simulator apparatus 12 for testing the spacecraft ranging equipment in a manner which simulates the Doppler effects which are encountered during actual space flight. Such apparatus 12 includes a first frequency translation means represented by an up-link R.F. Doppler simulator 50 for shifting the frequency of the radio-frequency signal by an amount representing the up-link Doppler effect on the carrier component thereof. The input side of the simulator 50 is coupled to the ground station transmitter amplifier 21 by way of a signal connecting link 51, while the output side of simulator 50 is coupled to the receiver portion of the spacecraft transponder 11 by means of a signal connecting link 52. These connecting links 51 and 52 may take the form of either coaxial cables or wave guide elements. The simulator 50 is also coupled to the master oscillator 15 by way of a connecting link 53 during the testing process. The connection is made at a circuit connection point 54 which is located at the output of the oscillator 15.

The dynamic Doppler simulator apparatus 12 also includes a second frequency translation means represented by a down-link R.F. Doppler simulator 55 for shifting the frequency of the returning radio-frequency signal by an amount representing the down-link Doppler effect on the carrier component of such signal. The input side of the simulator 55 is coupled to the transmitting portion of the spacecraft transponder 11 by way of a connecting link 56, while the output side of the simulator 55 is coupled to the ground station receiver R.F. and I.F. circuits 22 by way of a connecting link 57. These connecting links 56 and 57 may take the form of either coaxial cables or wave guide elements. The simulator 55 is also coupled to the master oscillator 15 by way of the connecting link 53.

The dynamic Doppler simulator apparatus 12 further includes control circuit means represented by a Doppler control unit 58 which is coupled to the simulator 50 for supplying thereto an analog type control signal for varying the frequency shift produced in the R.F. simulator 50 as a function of time in a manner corresponding to a typical variation in spacecraft velocity. A signal from the simulator 50 is supplied to the simulator 55 for varying the frequency shift therein in a corresponding manner.

The Doppler simulator apparatus 12 also includes a code Doppler and range delay simulator unit 60. This simulator unit 60 includes signal-modifying circuit means for shifting the frequency of the modulation signal frequency components by an amount representing the corresponding Doppler effects on the R.F. carrier sidebands produced by such modulation components. This signal-modifying circuit means is coupled to the modulation signal generating portion of the ground station transmitting equipment by way of signal connecting links 61 and 62. These connecting links 61 and 62 run to circuit connection points 63 and 64, respectively, which are located intermediate the transmitter clock generator 16 and the transmitter code generator 17. During the testing process, the normal connecting link 65 between points 63 and 64 is removed.

The simulator 60 also includes time delay means for causing a time delayed modulation signal to be supplied to the carrier modulator portion of the ground station transmitting equipment. This time delay means is for the purpose of producing a time delay corresponding to a radio wave propagation time which might be encountered under actual space flight conditions. Such time delay means is coupled to the modulation signal generating portion of the ground station transmitting equipment by way of signal connecting links 66 and 67. In particular, these links 66 and 67 are connected to circuit connection points 68 and 69, respectively, which are located intermediate the transmitter code generator 17 and the phase modulator 18. During the testing process, the connecting link 70 normally located between the connection points 68 and 69 is removed.

Referring now to FIG. 4 of the drawings, there is shown in greater detail the manner of construction of various portions of the dynamic Doppler simulator apparatus 12. As will be seen, there are used various mixer circuits for mixing or heterodyning two different signals to produce sum-frequency and difference-frequency output signals. Each of these mixer circuits is a balanced mixer or balanced modulator circuit. This serves to suppress the "carrier" component and to pass only the sum and difference or upper and lower sideband components. Each of the mixer circuits also includes a sideband filter for selecting the upper sideband and suppressing the lower sideband or vice versa.

As seen in FIG. 4, the up-link R.F. Dopper simulator 50 includes a mixer circuit 71 to which is supplied the modulated radio-frequency signal appearing at the output of transmitter amplifier 21. The $f_o$ signal from the master oscillator 15 is supplied to a second input of the mixer 71 by way of an amplifier 72. Mixer 71 heterodynes these two sets of input signals to produce sum and difference-frequency signals. The difference-frequency signals are selected by the sideband filter in the mixer 71 and passed to a second mixer circuit 73. The $f_o$ signal appearing at the output of amplifier 72 is also supplied to a 16:1 frequency divider circuit 74. The resulting signal having a frequency of one-sixteenth $f_o$ appearing at the output of divider 74 is supplied to a first input of a mixer 75. The $f_o$ signal from amplifier 72 is supplied to a second input of the mixer 75. The sideband filter in mixer 75 selects the sum-frequency signal ($^{17}\!/_{16} f_o$) and supplies it to a further mixer circuit 76. Supplied to the second input of mixer 76 is a signal generated by a voltage controlled oscillator circuit 77.

This VCO circuit 77 is a stable oscillator circuit which is centered nominally at a frequency of $\frac{1}{16} f_o$. An analog voltage signal is supplied to the control voltage terminal of the VCO circuit 77 by the Doppler control unit 58. This control voltage drives the VCO 77 to a frequency of ($f/16 - f_{du}$) where $f_{du}$ simulates the desired up-link R.F. Doppler shift. The change in frequency of the signal from VCO 77, namely, the $f_{du}$ component, will vary in proportion to the variations in the control voltage from the Doppler control unit 58. A negative sign is used for $f_{du}$ for the case of a closing spacecraft velocity and a positive sign is used for the case of an opening spacecraft velocity. (This polarity convention is reversed in the mixer 76.)

The mixer 76 mixes the two input signals supplied thereto and selects the difference signal to produce an output signal of frequency $(f_o+f_{du})$. This output signal is supplied to the second input of the mixer 73. Mixer 73 mixes the two signals supplied thereto and selects the sum-frequency sideband components to produce an output signal having a carrier component of frequency $(f_t+f_{du})$. This output signal is a modulated R.F. signal corresponding to the original modulated R.F. signal supplied by connecting link 51 to mixer 71 except that the carrier component and each of the sideband components have been translated or shifted in frequency by an amount $f_{du}$. Thus, the frequency spectrum of the signal is shifted as a whole. This translation operation does not change the width of the frequency spectrum. It only shifts the frequency spectrum as a whole in an upward or downward direction frequencywise.

The down-link R.F. Doppler simulator 55 is of an approximately similar construction and operates in an approximately similar manner except that the magnitude of the Doppler shift, in this case the down-link Doppler shift "$f_{dd}$," is slightly different since the spacecraft transmitted radio frequency is different from the ground station transmitter frequency by the transponder ratio "$m$," where $m=f_{ts}/f_{rs}$. In particular, the incoming transponder signal of frequency $f_{ts}$ being supplied thereto by way of the connecting link 56 is supplied to a first mixer circuit 78. The $f_o$ signal is supplied by way of an amplifier 79a to a frequency multiplier 79b. Frequency multiplier 79b multiplies the frequency of this signal by the transponder ratio factor "$m$." This $mf_o$ signal is supplied to a second input of the mixer 78. The difference frequency or lower sidebands are selected in the mixer 78 and supplied to a mixer 80. The $mf_o$ signal from frequency multiplier 79b is also supplied to a 16:1 frequency divider circuit 81 and the resulting $mf_o/16$ signal is supplied to a mixer circuit 82. Such circuit 82 mixes the $mf_o/16$ signal with the $mf_o$ signal from multiplier 79b and selects the sum-frequency component of $17/16\ mf_o$ and supplies such component to a mixer circuit 83. The stable voltage controlled oscillator circuit 77 in the up-link Doppler simulator unit supplies a signal of frequency of $$(f_o/16-f_{du})$$

to a frequency multiplier 84 which multiplies the frequency of such signal by the transponder ratio factor "$m$." This multiplied signal is then supplied to a second input of the mixer 83. Since VCO circuit 77 is controlled by the analog control voltage from the Doppler control unit 58, this determines the value of the down-link Doppler shift component "$f_{dd}$" since $f_{dd}=mf_{du}$. Mixer 83 selects the lower sideband (difference frequency) signal $(mf_o+mf_{du})$ and supplies it to the second input of the mixer 80. Mixer 80 selects the upper sideband components of the two signals supplied thereto to produce the resulting output signal which is supplied by way of the connecting link 57 to the ground station receiver R.F. and I.F. circuits 22. This signal is a modulated radio-frequency carrier signal corresponding to that received from the spacecraft except that the frequency spectrum of this translated signal has been shifted by an amount "$f_{dd}$" relative to the spectrum of the signal transmitted from the spacecraft. The width of the signal spectrum is not changed by this translation process.

The Doppler control unit 58 generates the analog voltage which simulates the variation with time of the up-link and down-link Doppler shifts $f_{du}$ and $f_{dd}$ for the selected spacecraft flight pattern. For sake of an example, assume that curve 45 of FIG. 3 represents the desired up-link Doppler frequency shift. In this case, the Doppler control unit 58 would need to generate a voltage which varies with time in the same manner as the frequency shift variation depicted in FIG. 3. Such a voltage variation can be produced by including in the control unit 58 a so-called optical line follower unit. Such a unit employs an optical tracking unit which responds to light reflection through a moving line graph which varies with time. The analog output signal from a photo cell which responds to this reflected light then constitutes the analog control voltage. By using different line graphs, different spacecraft flight patterns and orbits can be simulated.

Where a digital computer is available at the ground station location, an alternative approach can be used to generate the analog control voltage. In particular, the digital computer can be used to drive a digital-to-analog converter, the output of which is used as the analog control voltage. This would provide the same flexibility in that the computer can be programmed to simulate a wide variety of flight patterns.

Considering now the details of the code Doppler and range delay simulator unit 60 as shown in FIG. 4, such simulator unit 60 includes signal-modifying circuit means for simulating the Doppler effect changes of the bandwidth of the signal spectrum and time delay means for simulating the radio wave propagation time between ground station and spacecraft. Considering first the signal-modifying circuit means, such circuit means intercepts the clock signal from generator 16 before it reaches the transmitter code generator 17, shifts its frequency in proportion to the Doppler effect, and then supplies the shifted frequency clock signal to the transmitter code generator 17 for use as the signal which drives such code generator 17. To this end, the intercepted clock signal of frequency $f_c$ is supplied by way of the connecting link 61 to an amplifier 85 located in the simulator unit 60. The amplified $f_c$ signal is supplied to the first input of a mixer circuit 86. The master oscillator signal of frequency $f_o$ is supplied by way of the connecting link 53 to a frequency divider 87 which divides the signal frequency by a factor of "$n$."

For one-way Doppler simulation, the factor "$n$" is equal to the ratio of the R.F. carrier frequency $f_t$ to the clock frequency $f_c$. For the assumed values of 2000 megahertz and 500 kilohertz, this gives for "$n$" a value of 4000. For two-way or round-trip Doppler simulation, a value of 2000 is used for "$n$." This doubles the Doppler shift of the clock frequency sidebands to take into account both the going and coming Doppler shifts.

The resulting signal of frequency $f_o/n$ from the divider 87 is supplied to the second input of the mixer 86. The difference frequency signal component is selected by the mixer 86 and supplied to a further mixer 88. The $(f_o+f_{du})$ signal produced by mixer 76 of the R.F. Doppler simulator 50 is supplied by way of a circuit connection or connecting link 89 to a second frequency divider 90 in the unit 60. This frequency divider 90 also divides by a factor of "$n$." This is the same "$n$" factor as for the divider 87. Both the divider 87 and the divider 90 may be frequency counter types of circuits. The reduced frequency signal from divider 90 is supplied to the second input of the mixer 88. The sum frequency component is selected by the mixer 88 and supplied to a shaper circuit 91.

This sum frequency signal is of the form:

$$f_c+\frac{f_{du}}{n} \qquad (8)$$

The second term in this equation represents the desired Doppler shift for the clock frequency component of the modulation signal before such signal is supplied to the R.F. modulator section of the transmitter. Thus, the desired Doppler shift of the clock signal can be represented by "$f_{dc}$" and is given by the following expression:

$$f_{dc}=\frac{f_{du}}{n} \qquad (9)$$

As discussed, the value of "$n$" is equal to the ratio of the R.F. carrier frequency $f_t$ to the clock frequency $f_c$ for one-way Doppler simulation and is equal to one-half of that value for two-way Doppler simulation.

The shaper circuit 91 converts the signal from mixer 88 into a square-wave signal of the same frequency. This square-wave signal is supplied by way of the connecting link 62 to the input of the transmitter code generator 17.

Considering now the time delay means included in the simulator unit 60 for simulating the radio wave propagation time, such means includes an adjustable time delay unit 92. Adjustment of the time delay provided by the unit 92 is made by means of an associated control knob 93. Such time delay unit 92 is connected by means of the connecting links 66 and 67 so as to be in series intermediate the transmitter code generator 17 and the modulation input of the phase modulator 18. As such, it serves to impart a time delay to the range code signals which simulates the spacecraft range or separation distance from the ground station. At lunar distances, the round-trip propagation time delay experienced by the radio signal will approach 3 seconds (2.66 seconds for a nominal lunar distance of 215,000 nautical miles). Since it is desired to simulate a variety of different spacecraft ranges, the time delay unit 92 is of the adjustable type. Thus, adjustment of the control knob 93 serves to adjust the time delay imparted to the signal passing through the delay unit 92.

Various types of time delay devices may be used in the time delay unit 92. Perhaps the simplest form of delay device is a tapped delay line. The taps should be close enough, time-wise, to provide the desired increments in time delay change. A more sophisticated technique which can be used includes the use of a digital type of delay system. This involves the use of a digital shift register having a length (i.e., number of stages) sufficient to provide the desired time delay between the time the signal enters the shift register and the time that it leaves the shift register. Such register would be provided with intermediate outputs to provide different values of time delay.

For the Apollo pseudo-random ranging system of the type shown in FIG. 1, the time delay requirements of the delay unit 92 are not as severe as might otherwise be the case. This results from the use of a series of relatively short subcode components to simulate a binary code sequence of much greater length. Thus, by providing relatively short time delays for each of the individual subcode components, a much longer range time delay is simulated. For example, for the four particular subcodes which will be used in the Apollo system, it is possible to simulate a range time delay of 0.75 second by individually delaying each of the individual subcode components by amounts of 65 microseconds and less. In this type of system, the time delay unit 92 includes a plurality of separate time delay devices, there being one for each of the individual subcode components.

As a further refinement, the time delay unit 92 can be provided with additional circuitry for providing automatic adjustment of the time delay. Such circuitry would include a timing unit for sensing the Doppler shift being simulated and adjusting the time delay mechanism to simulate a corresponding change in spacecraft range.

OPERATION OF DOPPLER SIMULATOR TESTING APPARATUS

The dynamic Doppler simulator apparatus 12 is constructed to simulate three different primary effects. First, it is constructed to simulate the range time delay or propagation time delay experienced by the radio waves in traveling from the ground station to the spacecraft and back again. This time delay is proportional to the range of or distance to the spacecraft. Such time delay is simulated by the time delay unit 92 (FIG. 4) which operates to delay the modulation signals generated by the transmitter code generator 17 by the appropriate amount before they are supplied to the phase modulator 18. It might be noted that the time delay of the high frequency R.F. carrier component, of itself, is of no practical significance in the present system. This is because of the fact that, except for the signal modulation, one R.F. cycle looks like the next. Thus, it is sufficient to delay the modulation signal before it is modulated onto the R.F. carrier.

The second primary effect which the Doppler simulator apparatus 12 is constructed to simulate is the overall shift in the frequency spectrum of the transmitted signal caused by the Doppler effect. This overall shift is simulated by the up-link R.F. Doppler simulator 50 and the down-link R.F. Doppler simulator 55. Each of these units 50 and 55 is a frequency translator or frequency shifter. The up-link unit 50 shifts the frequency spectrum by an amount which simulates the up-link Doppler effect on the R.F. carrier. Similarly, the down-link unit 55 further shifts the frequency by an amount which simulates the down-link Doppler effect on the R.F. carrier. Each of these units 50 and 55 provides a Doppler shifted signal which is phase coherent with the original signal. This results from the use of the $f_o$ signal produced by the master oscillator 15 to derive the Doppler frequency shifts produced by the units 50 and 55.

The third primary effect which the Doppler simulator apparatus 12 is constructed to simulate is the change in width or bandwidth of the radio wave frequency spectrum which is caused by the Doppler effect. This change in spectrum width is simulated by changing the frequency of the clock signal generated by the transmitter clock generator 16 before such signal is used to produce the other modulation signal components which, in the present example, are the range code signals produced by the transmitter code generator 17. The clock signal controls or determines the bit width of the binary coded signal sequences produced by the code generator 17. Thus, changing the clock signal frequency also changes the code signal bit width or, in other words, the maximum binary bit rate. This causes a corresponding change in the width of the frequency spectrum of the subsequently produced modulated R.F. signal. In other words, lowering the frequency of a modulation signal component moves the subsequently produced sideband component in closer to the R.F. carrier component and raising the frequency of a modulation signal component moves the resulting R.F. sideband component further out from the R.F. carrier frequency.

The Doppler shifting of the R.F. sideband components is made to be phase coherent with the Doppler shifting of the R.F. carrier component because the clock frequency Doppler shift "$f_{dc}$" produced by units 85–91 (FIG. 4) is derived directly from the carrier Doppler shift signal component "$f_{du}$." This is why the signal of frequency $(f_o + f_{du})$ is supplied from the R.F. Doppler unit 50 to the code Doppler unit 60 by way of the circuit connection 89. Another advantage of deriving the clock signal Doppler shift in this manner is that the clock Doppler shift will, as a consequence, always vary in direct proportion to the R.F. carrier Doppler shift and at the same rate. Thus, a single Doppler control unit, namely, the control unit 58, serves to control both the carrier and the sideband Doppler shifting.

In order to perform the ground testing of the spacecraft ranging equipment, the dynamic Doppler simulator apparatus 12 is connected to the spacecraft ranging system equipment in the manner depicted in FIG. 1, the normal equipment connecting links 65 and 70 being removed. The control knob 93 on the time delay unit 92 (FIG. 4) is set to the spacecraft range which it is desired to simulate. The appropriate program line graph for the particular flight pattern which it is desired to simulate is placed in the optical tracking unit located in the Doppler control unit 58. The preliminary setup of the ground station receiver circuits is performed in the manner previously indicated. The optical tracker located in the Doppler control unit 58 is then started. At the desired instant thereafter, the ground station range counter 29b is reset to zero and the code correlation process in the receiver portion of the equipment is commenced. If the spacecraft ranging system is operating properly, then the ground station range counter 29b will provide range measurements which are in agreement with the flight pattern values selected for the Doppler control unit 58 and the time delay unit 92. If there is a significant lack of agreement, when the proper remedial steps can be performed before the ranging system is put into use for an actual space flight.

The Doppler simulator testing apparatus of the present invention is a flexible type of apparatus which can be readily programmed to accommodate a wide variety of spacecraft flight patterns. In addition to its use in testing spacecraft communications and ranging equipment, the simulator apparatus can also be used for purposes of training ground station personnel in the use of the spacecraft equipment. It can also be used for practice purposes for keeping the performance of the ground station personnel at a high level of efficiency during extended periods which may occur between space flights.

In addition to spacecraft ranging systems, the techniques of the present invention are also applicable to the various other spacecraft communications systems. These techniques can, for example, be applied to the spacecraft PCM data telemetry system, the spacecraft television system, the spacecraft voice (up and down) communications system, and the spacecraft emergency voice communications system. Where multiple subcarrier signals are involved, this would involve the frequency shifting of the individual subcarriers.

What is claimed is:

1. Apparatus for testing spacecraft radio frequency ranging and communications equipment in a manner which simulates actual space flight conditions comprising:

frequency translation means for transferring a modulated radio-frequency carrier signal from transmitting equipment to separate receiving equipment both of which are stationary relative to one another during the testing process, such frequency translation means including means for shifting the frequency of the radio-frequency carrier by an amount representing a Doppler effect which might be encountered when at least one of these equipments is moving at a spacecraft velocity relative to the other; and signal-modifying circuit means coupled to the modulation signal generating portion of the transmitting equipment for causing a modified modulation signal to be supplied to the carrier modulator portion of such equipment, each frequency component of such modified modulation signal having a frequency shift representing the corresponding Doppler effect on the radio-frequency carrier sidebands for such frequency component.

2. Apparatus in accordance with claim 1 and further including time delay means for causing a time delayed modulation signal to be supplied to the carrier modulator portion of the transmitting equipment, such time delay corresponding to a radio wave propagation time which might be encountered when the transmitting and receiving equipments are separated by a selected spacecraft-type separation distance.

3. Apparatus in accordance with claim 1 and further including control circuit means coupled to the frequency translation means for varying the frequency shift of the radio-frequency carrier as a function of time in a manner corresponding to a typical veriation in spacecraft velocity, the signal-modifying circuit means of claim 1 being responsive to a signal from the frequency translation means for varying the frequency shifts of the modified modulation signal components in a proportionate manner.

4. Apparatus for testing spacecraft radio-frequency ranging and communications equipment in a manner which stimulates actual space flight conditions wherein such equipment includes first transmitting and receiving equipment and second transmitting and receiving equipment which, in use, will be spaced apart from and undergoing spacecraft-type movement relative to one another comprising:

first frequency translation means for transferring a modulated radio-frequency signal from the first transmitting equipment to the second receiving equipment both of which are stationary relative to one another during the testing process, such frequency translation means including means for shifting the frequency of the radio-frequency carrier by an amount representing a Doppler effect which might be encountered when at least one of these equipments is moving at a spacecraft velocity relative to the other;

signal-modifying circuit means coupled to the modulation signal generating portion of the first transmitting equipment for causing a modified modulation signal to be supplied to the carrier modulator portion of such equipment, each frequency component of such modified modulation signal having a frequency shift representing the corresponding Doppler effect on the radio-frequency carrier sidebands for such frequency component; and second frequency translation means for transferring a modulated radio-frequency carrier signal from the second transmitting equipment to the first receiving equipment both of which are stationary relative to one another during the testing process, such frequency translation means including means for shifting the frequency of the radio-frequency carrier by an amount representing a Doppler effect which might be encountered when at least one of these equipments is moving at a spacecraft velocity relative to the other.

5. Apparatus for testing spacecraft radio-frequency ranging and communications equipment in a manner which simulates actual space flight conditions wherein such equipment includes transmitting equipment for transmitting a radio-frequency carrier signal modulated by a modulated subcarrier signal and receiving equipment for receiving such modulated carrier signal comprising:

frequency translation means for transferring the modulated radio-frequency signal from the transmitting equipment to the receiving equipment both of which are stationary relative to one another during the testing process, such frequency translation means including means for shifting the frequency of the radio-frequency carrier by an amount representing a Doppler effect which might be encountered when at least one of these equipments is moving at a spacecraft velocity relative to the other; and signal-modifying circuit means coupled to the modulation signal generating portion of the transmitting equipment for shifting the frequency of the subcarrier by an amount representing the corresponding Doppler effect on the radio-frequency carrier sidebands for such subcarrier component.

6. Apparatus for testing spacecraft radio-frequency ranging equipment in a manner which simulates actual space flight conditions wherein such equipment includes transmitting equipment having a clock signal generator for generating a clock signal, a code signal generator driven by the clock signal for generating code signals which are related in frequency to the clock signal frequency and a radio-frequency modulator for producing a radio-frequency carrier signal which is modulated by the code signals comprising:

frequency translation means for transferring the modulated radio-frequency carrier signal from the transmitting equipment to separate receiving equipment both of which are stationary relative to one another during the testing process, such frequency translation means including means for shifting the frequency of the radio-frequency carrier by an amount representing a Doppler effect which might be encountered when at least one of these equipments is moving at a spacecraft velocity relative to the other; and signal-modifying circuit means coupled to the clock signal generator portion of the transmitting equipment for shifting the frequency of the colck signal by an amount representing the corresponding Doppler effect on the radio-frequency carrier sidebands of such clock signal.

7. Apparatus in accordance with claim 6 and further including time delay means coupled to the code signal generator for time delaying the code signals supplied to the radio-frequency modulator, such time delay corresponding to a radio wave propagation time which might be encountered when the transmitting and receiving equipments are separated by a selected spacecraft-type separation distance.

8. Apparatus in accordance with claim 6 and further including control circuit means coupled to the frequency translation means for varying the frequency shift of the radio-frequency carrier as a function of time in a manner corresponding to a typical variation in spacecraft velocity, the signal-modifying circuit means of claim 6 being responsive to a signal from the frequency translation means for varying the frequency shifts of the clock signal in a proportionate manner.

9. Apparatus in accordance with claim 6 wherein the signal-modifying circuit means is responsive to a signal from the frequency translation means for causing the shifted frequency clock signal to be phase coherent with the shifted frequency radio-frequency carrier.

10. Apparatus for testing spacecraft radio-frequency ranging equipment in a manner which simulates actual space flight conditions wherein such equipment includes ground station transmitting equipment having a clock signal generator for generating a clock signal, a code signal generator driven by the clock signal for generating code signals which are related in frequency to the clock signal frequency and a radio-frequency modulator for producing a radio-frequency carrier signal which is modulated by the code signals, ground station receiving equipment and spacecraft transponder type transmitting and receiving equipment, such testing apparatus comprising:

up-link frequency translation means for transferring the modulated radio-frequency carrier signal from the ground station transmitting equipment to the spacecraft receiving equipment both of which are stationary relative to one another during the testing process, such frequency translation means including means for shifting the frequency of the radio-frequency carrier by an amount representing a Doppler effect which might be encountered when the spacecraft receiving equipment is moving at a spacecraft velocity;

signal-modifying circuit means coupled to the clock signal generator portion of the ground station transmitting equipment for shifting the frequency of the clock signal by an amount representing the corresponding round-trip Doppler effect on the radio-frequency carrier sidebands of such clock signal; and down-link frequency translation means for transferring a modulated radio-frequency carrier signal from the spacecraft transmitting equipment to the ground station receiving equipment both of which are stationary relative to one another during the testing process, such frequency translation means including means for shifting the frequency of the radio-frequency carrier by an amount representing the Doppler effect which would be encountered when the spacecraft transmitting equipment is moving at the same velocity as the spacecraft receiving equipment.

References Cited

UNITED STATES PATENTS

| | | | |
|---|---|---|---|
| 2,935,701 | 5/1960 | Robinson et al. | 343—17.7 X |
| 2,953,780 | 9/1960 | Goldfischer | 343—17.7 |
| 3,162,854 | 12/1964 | Campbell | 343—17.7 |
| 3,332,078 | 7/1967 | Conrad | 343—17.7 |

RICHARD A. FARLEY, Primary Examiner

T. H. TUBBESING, Assistant Examiner

U.S. Cl. X.R.

35—10.4